COMPUTER SCANNING APPARATUS

Original Filed Aug. 21, 1958

INVENTORS
DURWARD F. SEARCY
BY THOMAS W. SCOTT
Adolph C. Hugin
ATTORNEY

COMPUTER SCANNING APPARATUS

Original Filed Aug. 21, 1958

6 Sheets-Sheet 2

INVENTORS
DURWARD F. SEARCY
BY THOMAS W. SCOTT
Adolph C. Hugin
ATTORNEY

INVENTORS
DURWARD F. SEARCY
THOMAS W. SCOTT
BY Adolph C. Hugin
ATTORNEY

INVENTORS
DURWARD F. SEARCY
THOMAS W. SCOTT
BY Adolph C. Hugin
ATTORNEY

COMPUTER SCANNING APPARATUS

Original Filed Aug. 21, 1958

INVENTORS
DURWARD F. SEARCY
BY THOMAS W. SCOTT
Adolph C. Hugin
ATTORNEY

COMPUTER SCANNING APPARATUS

Original Filed Aug. 21, 1958

INVENTORS
DURWARD F. SEARCY
BY THOMAS W. SCOTT
Adolph C. Hugin
ATTORNEY

United States Patent Office 3,327,097

Patented June 20, 1967

3,327,097

COMPUTER SCANNING APPARATUS

Durward F. Searcy and Thomas W. Scott, Shreveport, La., assignors to United Gas Corporation, a corporation of Delaware Original application Aug. 21, 1958, Ser. No. 756,503. Divided and this application Apr. 15, 1963, Ser. No. 273,081

7 Claims. (Cl. 235—61.6)

This application is a division of application Ser. No. 765,503, Durward F. Searcy and Thomas W. Scott, for Binary Computer, filed Aug. 21, 1958, and now abandoned, but continued as application Ser. No. 359,541, filed Mar. 31, 1964, and now Patent No. 3,296,420.

This invention relates to method and apparatus for reading charts and more particularly to charts plotting time against a variable. The apparatus and method are particularly useful in reading charts having two traces and computing the square root of the product of the two traces.

Flow of natural gas through a pipeline is measured as a function of the static pressure and differential pressure across an orifice in the line. These two variables are recorded on charts, usually circular, as a function of time. The instantaneous flow rate in the line varies as the square root of the product of these two pressures. The total accumulated flow during any period of time is the integral of the instantaneous flow rate integrated over the desired period.

The presently used method of extracting the recorded information from the circular chart and making the necessary integral-of-the-square root-of-the-product computation involves the use of a manually operated mechanical computer commonly called an "integrator." To use this device the operator must manually retrace the two pressure lines on the chart with two independently mounted inking pens. The pressure levels thus sensed by the inking pens are used as inputs to a mechanical analog computer which integrates the information on the chart.

The speed at which the chart rotates in this procedure is continuously controlled by the operator with a foot pedal. Of course the two following pens are simultaneously moved one by each hand of the operator. This method of interpreting the chart requires that the operator coordinate three rather difficult motions and, consequently, is subject to much human error when employed by an experienced operator. The method is also very time-consuming.

It is an object of this invention to provide an apparatus for automatically scanning a chart of the type referred to above and determining from the chart the total cumulative flow.

Another object is to provide an automatic scanning device which correlates successive scans of a chart with a coded member to provide for various computations to be made from the coded member.

Yet another object of this invention is to provide an improved computer scanning apparatus.

Further objects and advantages of this invention will become apparent from the following description referring to the accompanying drawings, and the features of novelty which characterize this invention will be pointed out with particularity in the claims appended to and forming a part of this specification.

In practicing this invention, a chart having traces thereon is scanned with electromagnetic radiation means and the information obtained from the scanning is correlated with a coded member. It will be appreciated that one or more traces could be scanned and correlated with the code on the member for many purposes.

In making multiplication, division or power changes, the coded member will be provided with a logarithmic code, and a linear value determined by scanning the chart will be converted to its logarithm by the logarithmic code. Preferably a disc which is related in speed to the scanning mechanism is provided with this code.

In determining the square root of the product of two pressures recorded on a chart to thereby determine the flow rate of fluid through a line, the chart is scanned to determine the linear value of the pressures at successive times. These linear values are converted to their logarithms by the logarithmic signal generated by the coded member, preferably a disc. The signals generated by the scanning means are utilized to determine the length of the signal generated by the coded disc and these two logarithmic signals are fed into a computer which performs the computations.

Preferably, this computer employs a binary counter for handling the logarithmic signals. After the logarithmic signals have been operated upon by the computer to determine $$\frac{\log X \text{ plus } \log Y}{2}$$

the binary counter remembers or stores this value. A second log signal then is generated by the coded disc, which second log signal is compared to the stored value. While the disc is generating the second log value, a linear signal also is being generated, the value of which is continuously instantaneously equal to the antilog of the concurrently instantaneously generated second log signal. When the second log signal equals the stored value, the binary counter emits a signal which stops the linear signal counter generation and thus gives the antilog of the computed stored value in the binary counter. This antilog signal is fed into an accumulator which accumulates successive antilogs computed by the device and after the desired number of scans have been made on the chart, the accumulated number represents the total of accumulated flow during the period of time covered by the chart. Of course, this figure must be corrected for temperature, gravity and orifice constant in the usual manner. Where one instrument is to be utilized in handling different type charts, it may also be necessary to introduce a chart factor.

On occasions, the two trace lines on a chart will cross each other and thus the scanner will only sense a single line. This would introduce a slight error into the reading. The scanner may also sense a third false trace due to dirt, etc., which would introduce error. To avoid this, a memory unit is provided which remembers or stores the computed antilog value of the last good scan, as seen by reference to FIG. 9, that is, one which scanned two trace lines. In the event the scanner senses only one or more than two trace lines, the apparatus rejects the computation of the binary counter and substitutes therefor the computation for the last good scan. This procedure is continued until the apparatus again scans two trace lines for a single scan.

A log curve flattens out very quickly and, therefore, difficulty may be experienced in generating a logarithmic signal with a disc of small size. In accordance with this invention, the logarithmic signal is generated in two parts. One signal is a series of short sections of a logarithmic curve to the base 2, and the other signal introduces a binary factor which substantially straightens out the curve.

In the drawings, wherein illustrative embodiments of this invention are shown and wherein like reference numerals indicate the like parts:

To determine gas flow, we wish to determine the sum of the logs of the two pressures, take one-half of this figure and determine the antilog of the figure so computed.

Figure 1:
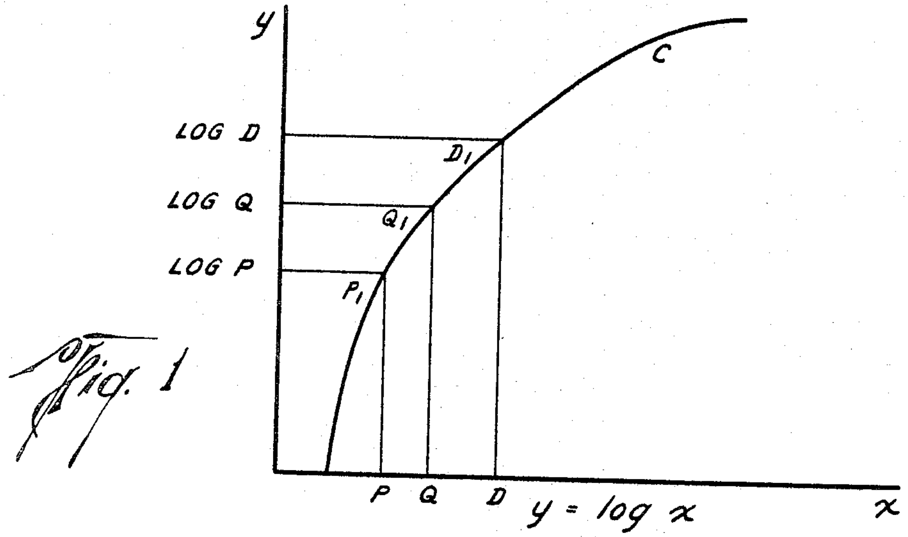
FIG. 1 is a graph of a log curve with linear values represented along the X-axis and the logs thereof represented along the Y-axis.

Referring to FIG. 1, there is shown a plot of a log curve in which Y is equal to the log of X. Along the axis X we may plot in the linear value of P and the linear value of D and determine their position $P_1$ and $D_1$, on the log curve. We may then plot in the logarithms of values along the Y axis.

Inasmuch as $$Q=\sqrt{PD}$$

$$\log Q=\frac{\log P+\log D}{2}$$

and $$\log Q=\log P+\frac{\log D=\log D}{2}$$

the log of Q may be determined by measuring one-half of the distance between log P and log D on the Y axis. Then by determining this value $Q_1$ on the log curve, we may read from the X axis the value of Q. Divisional application Ser. No. 273,079, Durward F. Searcy and Thomas W. Scott, for Computer, filed Apr. 15, 1963, includes a computer for deriving results of this type, regardless of the means for scanning or otherwise obtaining the signals for making the computations.

Figures 2, 3:
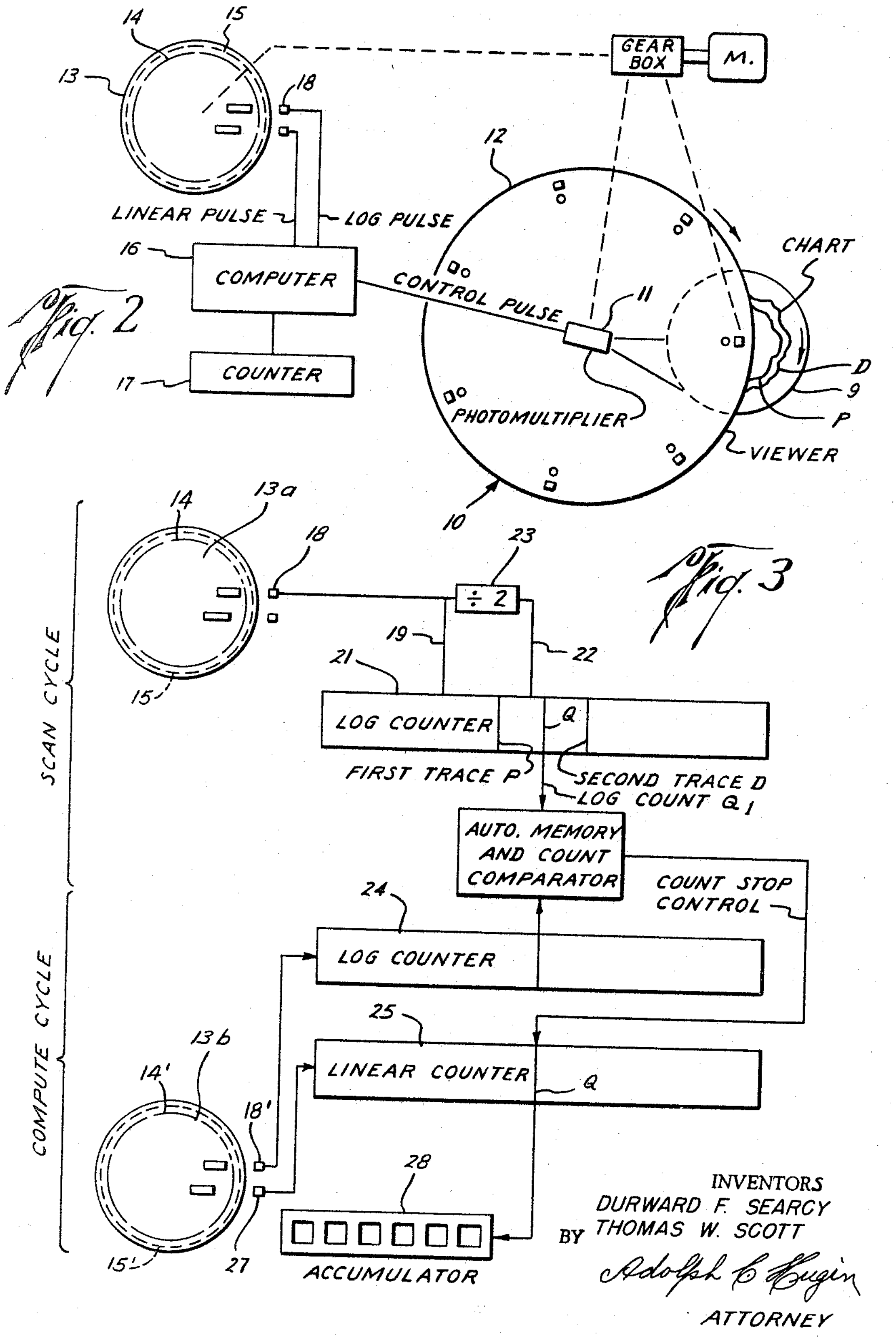
FIG. 2 is a diagrammatic representation of an apparatus for carrying out this invention.
FIG. 3 is a diagrammatic representation of the coded disc computer preferred for use with this invention.

The method of automatically measuring the linear value of two pressures, performing the computation shown in FIG. 1 and extracting the antilog of the computed value in accordance with this invention is illustrated diagrammatically in FIG. 2. In this device a circular chart 9 is rotated slowly along its time axis. A scanning device indicated generally at 10 and having an electromagnetic radiation scanning means is moved along successive time increments of the chart 9 to measure the distance between each of the traces D and P from their zero reference point. Preferably this measurement is taken with a light sensitive means, such as the photomultiplier 11 and associated lenses and mirrors which will be explained more fully hereinafter.

Geared to a disc 12, which moves the electromagnetic radiation sensitive means across the chart, is a coded member, such as coded disc 13. The rotating discs 12 and 13 are geared together to correlate signals from the photoelectric cell with the signals to be generated by the coded disc. The coded disc has thereon several codes, one of which is a logarithmic code 14 so that light passing through the logarithmic code holes will generate a logarithmic signal. Also on the disc is a linear code 15. The log code 14 is represented by the ordinate or Y axis coordinates and the linear code 15, being proportional to the axis of the variable (pressure), is represented by the abscissa or the X axis coordinates of FIG. 1. From what has been explained, it will be seen that beginning rotation of code disc 13, at the zero point on the logarithmic and linear codes as the electromagnetic radiation sensitive means begins to scan the chart 9, will permit generation of a signal from the scanning means, at the time that a logarithmic signal has been generated, which is the log function of the linear value of the pressure at P. Thus, when the scanning device sends a control pulse to the computer, signaling that it has passed over the pressure trace P, the logarithmic value theretofore generated will be equal to the ordinate of P′ on the log curve of FIG. 1.

Thereafter, the scanning device will signal that it has passed over the chart trace D, and, at that time, the logarithmic signal which has been generated will be equal to the logarithmic value at point $D_1$ of FIG. 1.

These two log functions of $P_1$ and $D_1$ may be fed into a computer which will determine one-half of their sum, and thus determine the point of $Q_1$ on the log curve of FIG. 1. Then the computer will determine the antilog of the point $Q_1$, and thus determine the linear value of Q. A computer for performing this function is represented at 16. The antilog thus computed is fed into a decimal counter, represented at 17, which integrates successive readings of the chart. Usually there will be a large number of these readings on each chart; for instance, as many as three to eight hundred.

It will be noted that the scanning device reads from the center outward on chart 9. Thus, between chart scans, there is a period of time equal to the chart scan time. Preferably, the coded disc makes two revolutions for each chart scan and is utilized in a compute cycle as shown in FIG. 3. In this figure, disc 13*a* represents the coded disc during the scan cycle, and disc 13*b* represents the coded disc during the compute cycle.

It is preferred that the log counters in FIG. 3 be of the binary type, as they may be simply designed to make the desired computations. The log pulses are picked up by photoelectric cell 18 and fed into the log counter 21 from the log scale 14 during the scan cycle.

Pulses from the log track pass through the line 19 and into the binary counter 21 until the first signal is received from the scanning device 11. Thereafter, the line 19 is closed and log signals are sent through line 22, wherein they are divided by 2, as indicated schematically at 23. The divided by 2 signals are then introduced into the counter 21 until the second trace is encountered by the scanning device.

Inasmuch as only one-half of the signals between trace P and D are introduced, the log count will only go up to the point Q. Thus, at the completion of the scan cycle, there will be standing in the log counter a value equal to $Q_1$ on the log curve of FIG. 1.

The computer then continues to operate, and the compute cycle proceeds, while the coded disc revolves through one revolution, and a second series of logarithmic pulses are generated. Preferably, these logarithmic signals are also generated by electromagnetic pulses are radiations, such as light pulses. The second log count is indicated schematically in FIG. 3 as being picked up by the photoelectric cell 18′ of the logarithmic counter 24. Actually photoelectric cell 18′ may be the same cell 18 which picked up the log count during the scan cycle rotation of the coded disc 13. It is indicated as a separate cell in FIG. 3 in order to simplify the schematic representation of the system. The computer is provided with a memory and automatic count comparator which signals when the log count picked up in counter 24 during the compute cycle is equal to the log count of $\log P+\frac{1}{2}(\log D-\log P)$ standing in the log counter 21 from the scan cycle. This signal trips the linear counter 25 which has been receiving linear pulses from the photoelectric cell 27 placed behind the linear track 15′, and the linear count is stopped.

This count is then transferred into the accumulator 28, where it is stored and integrated with subsequent counts made in like manner. Of course after a chart has been completely scanned, the value standing in the accumulator represents the total gas flow, when corrected with orifice and chart constants and for temperature and gravity.

As noted above, it is preferred to use a binary counter because this counter will readily lend itself to storing or remembering the scan log count and automatically comparing it with the compute log count. Such a binary counter is shown schematically in FIG. 4. If we assume that the top row of digits represents a log scan of 95 impulses during the scan cycle, the computer or log counter would be set in the manner shown. Then if we complement the counter and change each of the digits to its opposite, as shown in the next lower line of the counter, the condition of the counter will be such that an additional count equal to the original log count of 95 will cause the maximum count to be present in the counter. This is represented by the next to the bottom line of digits. At this time, one additional impulse will return to counter to its original condition as indicated in the bottom line of digits. This characteristic of the binary counter may be utilized by taking an impulse from the binary counter returning to zero to trip the linear counter and stop any further count from reaching the linear counter. Thus it is not necessary to use two log counters, and a single binary counter may be utilized to make both log counts and automatically to compare the count.

Figure 4:
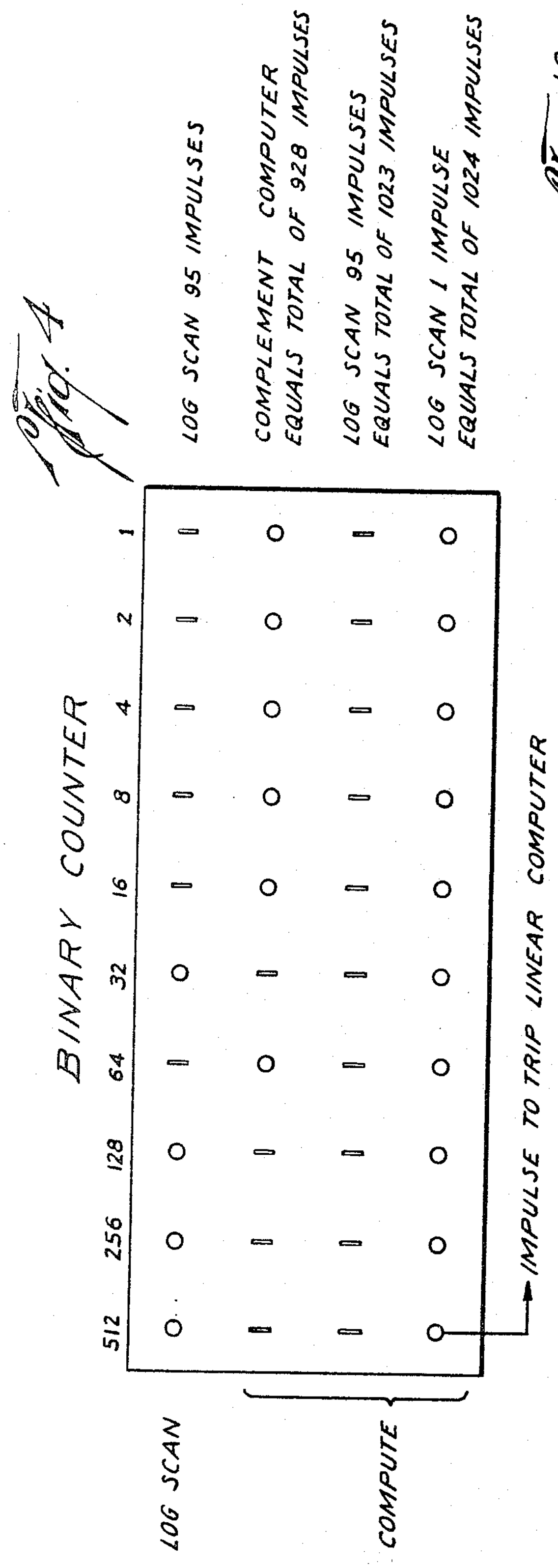
FIG. 4 is a diagrammatic representation of a binary counter illustrating the manner in which the two log scans are compared to trip the linear counter when the second log scan is equal to the first log scan.

The binary counter schematically illustrated by FIG. 4 may be combined with the coded disc to accomplish the desired functions. The binary counter may be simply and easily complemented by tripping a complementing device after the scan cycle has been completed and before the compute cycle has begun. This trip could be provided on either the coded disc or the scan disc. In the device illustrated, it is provided on the scan disc, as will be pointed out hereinafter. Thus, after the impulses from the log track during the scan cycle have been introduced into the binary counter, the counter is complemented by a signal from either the scanning device or the coded disc. Then during the compute cycle the log track again begins to introduce log signals into the counter. As soon as these signals are equal in number to those introduced during the scan cycle plus 1, the binary counter will trip and return to its zero condition. When this happens the impulse from the counter will trip the linear counter and the antilog Q of $Q_1$ (see FIG. 1) will be stored in the accumulator. This antilog is correct for all practical purposes because the sum of the log signals plus 1 is substantially the same as the original scanned log signals, because the plus 1 signal is a relatively negligible quantity in computations of the magnitude of this type.

The preferred form of scanner mechanism and coded disc is shown in FIGS. 6, 7, 8, and 11. The chart 9, which is to be read, is mounted on a chart table 30, which is rotated through suitable gears in gear box 31. The drive for both the chart 9 and the chart scanner, as well as the coded disc 13, is from a motor 32. The coded disc 13 is mounted directly on the motor shaft, and the output of the motor is passed through the large gear box 33 which drives the scan disc 12. The power for driving the chart table 30 is taken off from the large gear box 33. This arrangement conveniently related rotation of the coded disc 13, the scan disc 12, and the chart table 30.

The scan disc 12 is mounted to overlie the chart 9, and preferably is much larger than the chart 9, so that it may contain a number of electromagnetic radiation pickups, such as the photoelectric scanning device illustrated. Circular charts have their variable, such as pressure, represented by curved lines radiating from the center of the chart. Thus, the chart may be made to move around its axis so that the angular changes around this axis represent time. To read along the curved line representing the variable, the scan disc has optical pickups positioned a distance from the center of the scan disc equal to the radius of the lines representing the variable on the chart with the center of the scan disc at the center of curvature of these lines. Therefore, the optical pickups will travel along the time lines on the chart and the trace signals generated during each scan will represent pressures at a substantially common time.

The optical pickup system is provided by a plurality of lenses 34 which are equally spaced about the scan disc. These lenses project light through holes 35 in the scan disc. These holes are on the order of .015 inch in diameter. The light projected through holes 35 is reflected by mirrors 36 through lenses 37 toward the center of rotation of the scan disc. The entire assembly is mounted within a light tight box 38, and no light is reflected except that received from the chart which is provided by a chart illuminator 39. This light will be picked up by the lenses as they pass over slot 40 in the bottom of the box 38.

Located approximately at the axis of rotation of the scan disc and directed toward the chart table is a photoelectric cell, such as the photomultiplier 11. The field of view of the photomultiplier begins approximately at the axis of rotation of the chart table and extends therefrom toward the periphery of the chart table. Thus, assuming the scan disc to rotate in a clockwise direction, the lenses will pass over the center of rotation of the chart table before they begin to transmit light which can be picked up by the photomultiplier. Then they will transmit light to the photomultiplier during the time that they pass from the center of the chart to the edge of the chart. As a lens passes over a trace on the chart, the light to the lens will be blocked out so that the amount of light passing to the photomultiplier will be reduced. When this happens, the photomultiplier will generate a signal which is transmitted to the computer in a manner to be hereinafter explained.

Other signals also are generated by the scan disc for each scan cycle. One of these signals is generated by a pin 40' passing between a lamp 41 and a photoelectric cell 42, and the other is generated by a pin 43 passing between the lamp 41 and a photoelectric cell 44. There are a plurality of these pins, with a pin 40' immediately preceding each scan cycle. This pin generates a signal which resets the counter and makes certain that it is ready to begin a cycle. The other pins 43 generate a signal after each lens has completed its scan. The signal from this latter photoelectric cell is utilized to complement the counter.

Figures 10, 11:
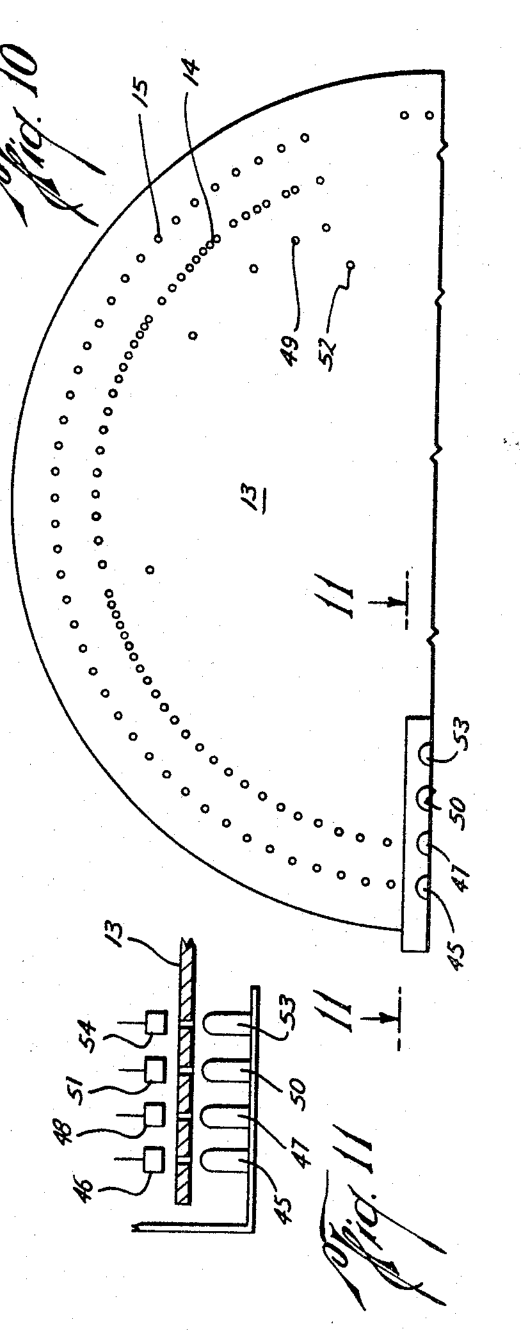
FIG. 10 is a segment of the coded disc on an enlarged scale.
FIG. 11 is a view along the lines 11—11 of FIG. 10.
Figure 6:
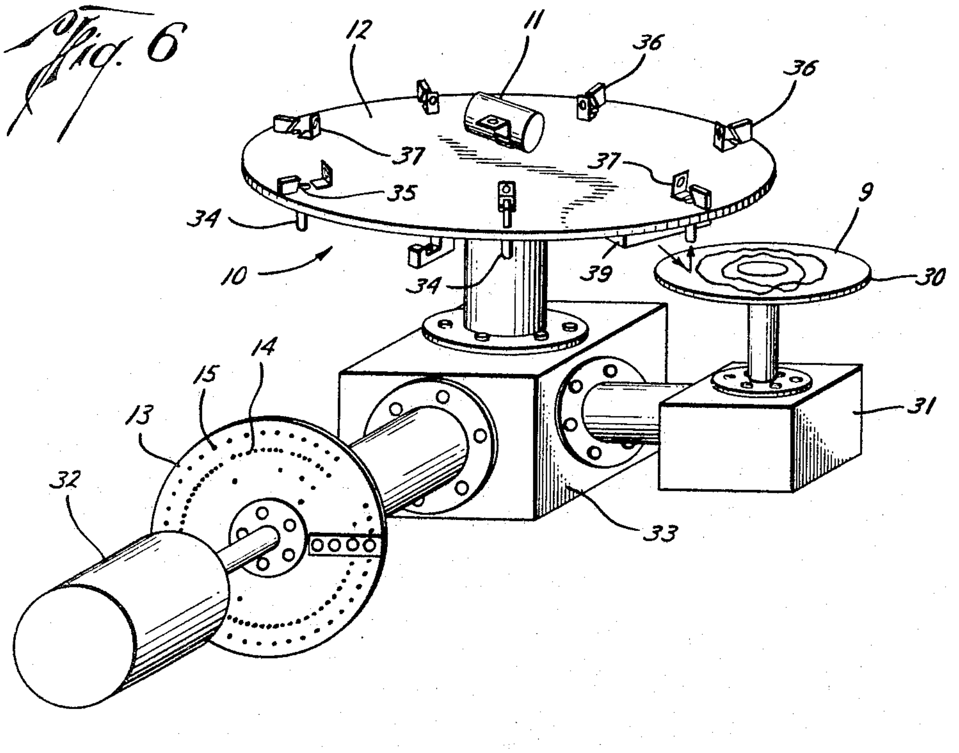
FIG. 6 is a schematic view of the chart scanner mechanism and coded disc preferred for use with this invention with the light tight box removed.
Figure 7:
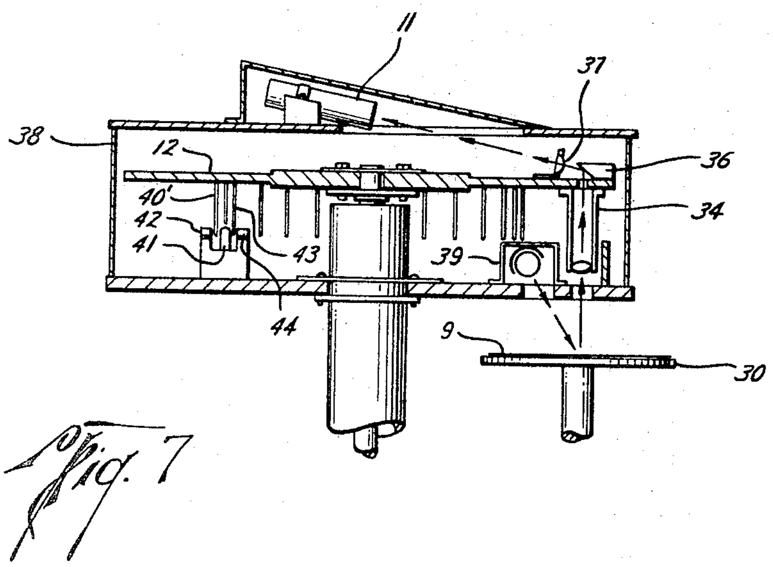
FIG. 7 is a view in side elevation with parts broken away of the preferred form of electromagnetic radiation optical scanner system.
Figure 8:
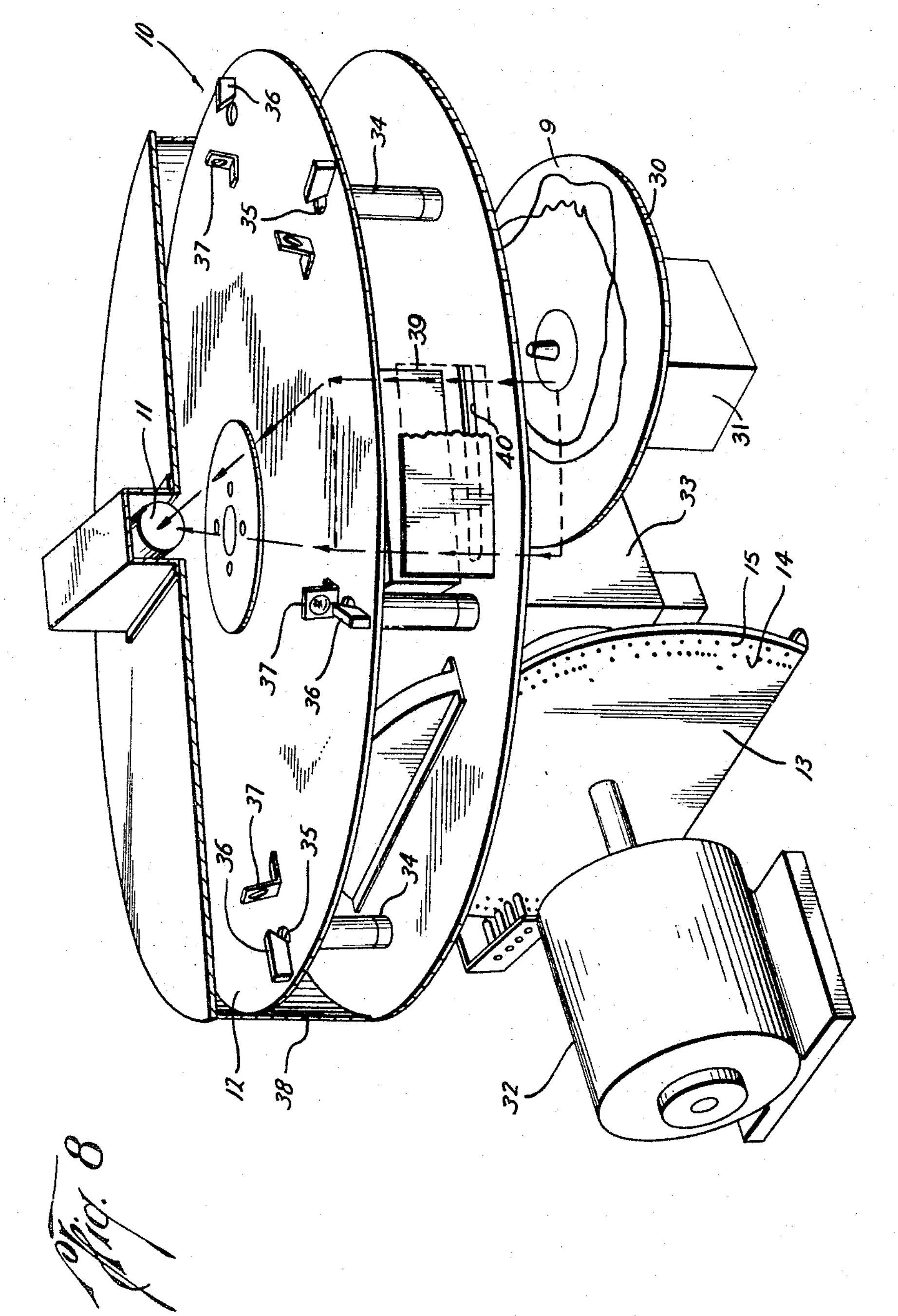
FIG. 8 is a perspective view of the chart scanner mechanism and coded disc with the light tight cover shown in cross section to better illustrate the mechanism.

The coded disc 13 is provided with four different codes (see FIG. 11). The outermost code 15 is a linearly spaced series of holes through which light from source 45 is passed to a photoelectric cell 46, such as a phototransistor.

Immediately inside of the linear code, there is provided a logarithmic code, which is a series of logarithmic codes to the base 2. Thus, the first series has one hole, the second series two holes, the third series four holes, the fourth series eight holes, and so on. Light passing through each of these holes from source 47 is picked up by a phototransistor 48.

Immediately inwardly from the logarithmic code there is provided a shift code 49 which is utilized to introduce a factor into the logarithmic code so that it is possible to utilize a series of logarithmic codes and utilize a small disc. One of the shift code holes is provided after each series in the logarithmic code, and pulses from light source 50 pass through these holes to the phototransistor 51. The manner in which pulses from this track introduce a factor into the logarithmic code will be explained hereinafter.

The fourth or innermost code has a single hole 52 which transmits light from source 53 to a phototransistor 54. As will be explained hereinafter, the single pulse generated before each cycle of the scan disc is utilized in conjunction with the shift track 49 so that on the compute cycle the same logarithmic pulses will be introduced into the counter as were introduced during the scan cycle.

Figure 5:
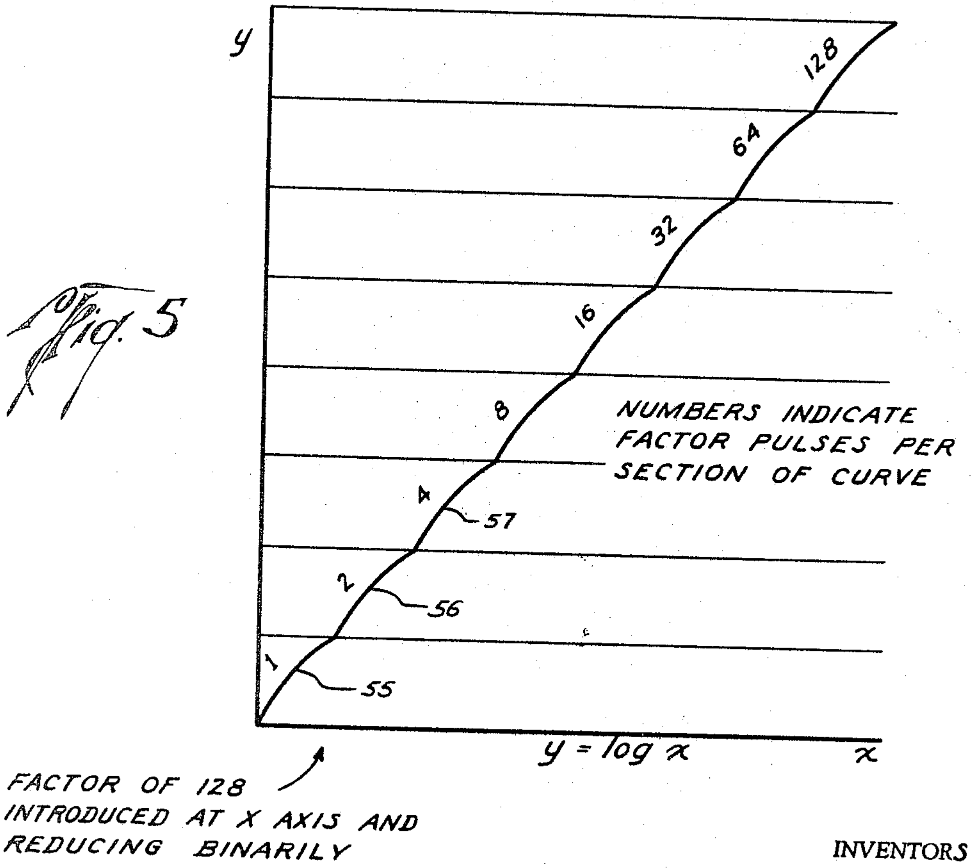
FIG. 5 is a chart plotting a logarithmic curve in which a binary factor has been introduced to straighten out the log curve in the manner contemplated by this invention.

In considering the relationship of the logarithmic code 14 and the shift code 49, reference is made to FIG. 5 wherein it is shown that the logarithmic curve is straightened out by introducing a binary factor into the system. Thus as shown in FIG. 5, the single pulse at the beginning of the scan cycle is represented by the first curved segment 55. In like manner the next cycle of the logarithmic curve which contains two pulses is shown by the curve section 56. The third section of the logarithmic code contains four pulses, and this is represented by curve 57. The number of pulses increases by progressions until the eighth section of the curve has a total of 128 pulses. In introducing the first pulse from the logarithmic scale into the counter, the factor introduced from the shift track weighs it in the counter and gives it a value of 128. In like manner, the next two pulses introduced are given a value of 64 each. In the third series of logarithmic pulses, each is given a weighted value of 32, and so on.

Figure 9:
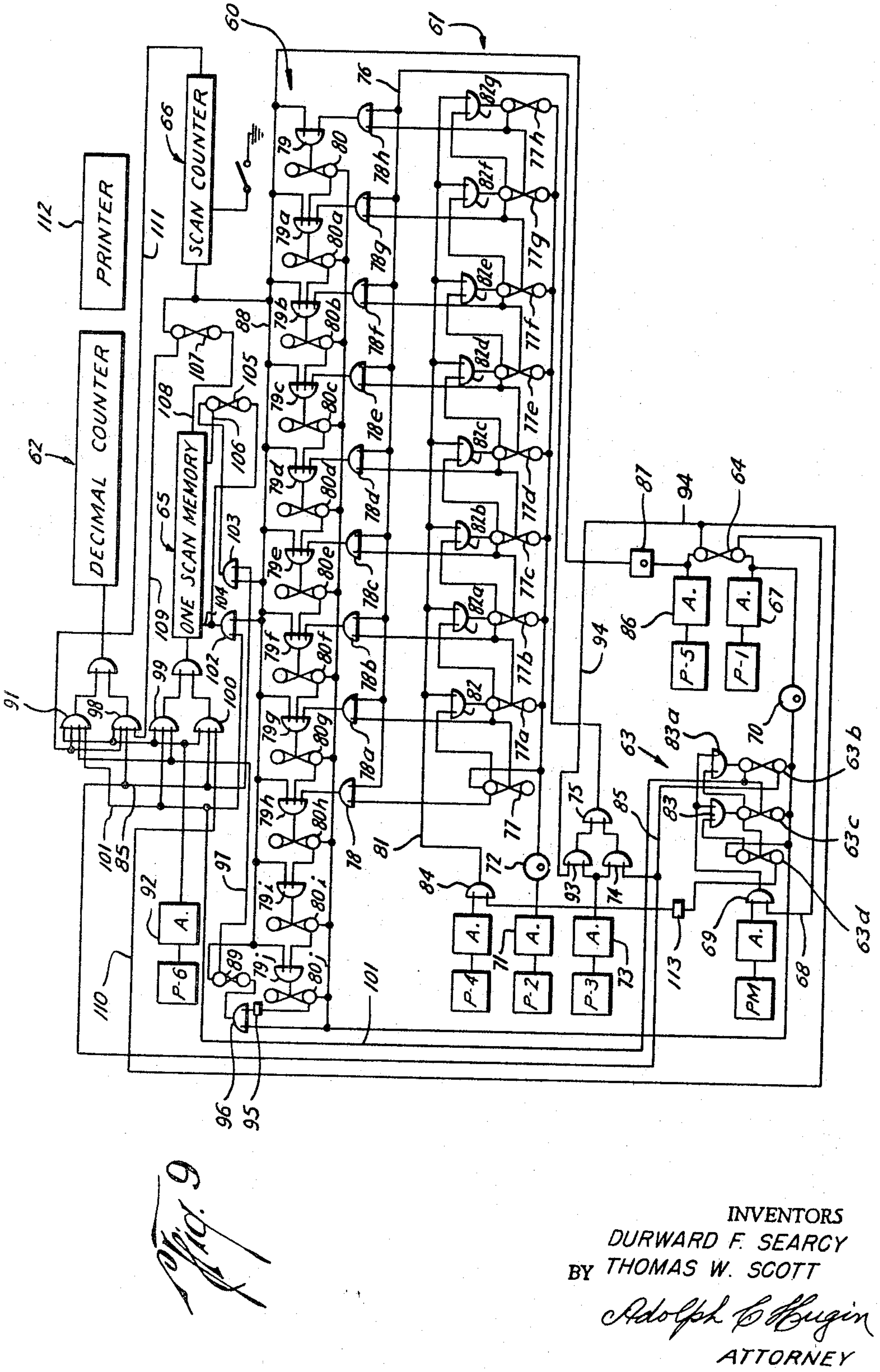
FIG. 9 is a schematic diagram of the computer preferred for use with this invention.

The computer for extracting the square root of the product of the two values being measured is shown diagrammatically in FIG. 9. Referring to FIG. 9, the binary counter is indicated generally at 60. This counter is controlled by a shift unit indicated generally at 61, which, as heretofore explained, introduces a factor into the computer to permit use of a series of logarithmic signals and straighten out the logarithmic curve being measured.

After the signal has been stored in the binary counter and the compute cycle begun, a linear signal is fed into the accumulator, such as the decimal counter indicated generally at 62. Control of the computer is provided by the ring-switcher, indicated generally at 63, and by a flip-flop 64, which respectively signal the beginning of a scan cycle and the beginning of a compute cycle.

In the event that a good scan is not made, a one-scan memory unit, indicated generally at 65, will feed the antilog of the last good scan logarithm into the decimal counter 62 as a substitute for the antilog of the bad scan logarithm.A scan counter, indicated generally at 66, is provided to block any further signals to the decimal counter 62 after a predetermined number of scans have been made.

*Apparatus operation*

The operation of the computer will be explained starting at the beginning of a scan cycle. As the scan disc 12 moves a lens 34 into position to begin a scan, a pin 40', FIG. 7, activates the photoelectric cell 42, which sends a pulse $P_1$ through amplifier 67 and flips flip-flop 64 to the down, or re-set, position. The flip-flop 64 impresses a signal on conductor 68 which is transmitted as one input to an AND gate 69. This and other AND gates as shown hereon are valves which permit the flow of current only when all incoming lines to the gate are at a negative potential.

A signal is also fed from amplifier 67 through the reset generator 70 to the ring-switcher 63 and to the binary counter 60 which resets all of the flip-flops in these two units except one of the flip-flops of the ring-switcher which is placed in a set position.

Approximately simultaneously with the generation of the pulse at $P_1$, a signal $P_2$ is generated through the single hole 52 on the coded disc and is fed into the amplifier 71. The signal from amplifier 71 energizes the reset generator 72, which resets all of the flip-flops in the shift unit 61. For purposes which will appear later, one flip-flop 77 of the shift unit is placed in the set position by the reset pulse.

The computer is now in condition to begin the scan cycle and substantially simultaneously with the signals $P_1$ and $P_2$, the coded disc begins to generate a logarithmic signal $P_3$. This logarithmic signal is fed into amplifier 73 and from the amplifier through suitable gate controls to the binary counter 60. A flip-flop **63*b* of the ring-switcher, when placed in the reset position, generates a signal which places gate 74 in a condition in which pulses from the log track will be passed through it. These pulses pass through an OR gate 75 to the input line 76 of the binary counter. It will be recalled that the reset track pulse $P_2$ set all of the flip-flops of the shift unit in the reset position with the exception of one flip-flop 77, which was placed in the set position. By so doing, the several gates 78*a* through 78*h* were placed in the OFF position and the gate 78 was placed in the ON position, because only the flip-flop 77 was impressing negative voltage on one of the gates 78 through 78*h*. Therefore, the first pulse from the log track will pass through OR gate 79*h* and flip flip-flop 80*h*** from the reset to set position.

Since there are eight shift track signal openings 49 on the coded disc, the generation of shift signals $P_4$ introduced a predetermined factor into the binary counter. If we ignore the flip-flop 80, the purpose of which will hereinafter appear, it will be seen that the signal pulse introduced into the binary counter through gate 78 has a weighted value of 128.

At this time, the first pulse $P_4$ is received from the shift track 49 on the coded disc. This pulse travels along the input line 81 of the shift track and is gated through gate 82 to flip-flop **77*a*. The pulse is permitted to pass through gate 82 because the flip-flop 77 when placed in set position generated a delayed output to gate 82 which placed it in ON position. The first shift track pulse shifts flip-flops 77*a* from the reset to set position. In set position flip-flop 77*a* generates a signal which opens AND gate 78*a*. This signal also flips flip-flop 77 to reset position which closes gates 78 and 82. A delayed signal is also generated by flip-flop 77*a* which places gate 82*a* in a position to receive a signal from the shift track. Thereafter, two signals are generated by the log track which pass through gate 78*a* and flip the flip-flop 80*g* of the binary counter to the set and then reset position. When the flip-flop 80*g* flips back to the reset position, a signal is generated which flips the flip-flop 80*h* from the set to reset position. This latter flip-flop in turn flips the flip-flop 80*i* to the set position. In this manner, the signals from the log track are introduced into the binary counter with each series of signals being introduced into successively lower order digit flip-flops of the binary counter. The flip-flops 80*h*, *i*, and *j* of the binary counter will represent the characteristic of the logarithm, and flip-flops 80 through 80*g*** will represent the mantissa of the logarithm.

Pulses from the coded disc continue to operate the binary counter until the first pulse is received from the photomultiplier PM indicating passage of trace P. This pulse passes through the AND gate 69 and AND gate 83 which controls flip-flop **63*c*. Since pulse $P_1$, which occurred immediately before the scan cycle began, triggered the pulse generator 70 and set flip-flop 63*d* and reset flip-flops 63*b* and 63*c*, gate 83 was in a condition to receive the first pulse generated by the photomultiplier, which will flip flip-flop 63*c*. Flipping of flip-flop 63*c* flips flip-flop 63*d* to reset position which sends a signal to a differentiation network 113. This differentiation network introduces a pulse through the OR gate 84 to the shift register input line 81 and shifts the flip-flop next in line to be shifted in the shift register. Inasmuch as the counter 60 is a binary counter, it allows only half of the impulses thereafter received from the log track to be effectively introduced into the binary counter so that this shift in effect divides all further log impulses to the binary counter by two. This divide-by-two feature necessitates the addition of flip-flop 80** in the binary counter to cover the situation in which the signal generated by the log track would use substantially the full capacity of the binary counter.

When the flip-flop **63*d* was switched to the reset position, the control signal to gate 83 was turned off and this gate closed; however, in shifting the flip-flop 63*c* from the reset to set position, a delayed action signal was applied to gate 83*a* to prepare it for passing the next incoming signal from the photomultiplier. When the second signal is received from the photomultiplier indicating scanning of the trace D, this signal passes through the gate 83a and flips flip-flop 63b to set position. In flipping flip-flop 63b from reset to set position, the signal is removed from line 85, which removes the signal from gate 74 and closes this gate. This prevents further signals $P_3$ from the log track passing into the input line 76 of the binary counter and stores in the binary computer the one-half of the sum of the logs of the two trace values. This count then is not disturbed until an "end scan" pulse $P_5$ complements the entire log counter (flip-flops 80–80j**).

As soon as the coded disc makes one complete revolution, a second signal $P_2$ is generated by a light passing through hole 52, which resets the shift unit in the same manner as before. Approximately simultaneous with this signal, a pin 43 causes the photoelectric cell 44 to generate a signal $P_5$ which is fed into amplifier 86. This signal flips flip-flop 64 to its set position, which energizes the pulse generator 87 and a complementing pulse is fed to the binary counter through line 88 to complement the binary counter 60. The complementing pulse is also fed to flip-flop 89 and flips it to its set position. When the flip-flop 89 is thus flipped, it places AND gate 91 in a condition to permit passage of signals to the decimal counter 62 when the other three connections are at the correct voltage. It will be noted that there are a number of other input signals to gate 91 the purposes of which will be explained later. It is assumed that under these conditions, all of the other control signals to gate 91 are maintained at a negative voltage.

All during the running of the coded disc, the linear track generates a signal $P_6$. This signal is fed through amplifier 92 to the gate 91. As the gate 91 has previously been closed due to the lack of a signal from flip-flop 89, this linear signal has not been introduced into the decimal counter; however, with opening of the gate 91, the signal generated by the linear track is fed into the decimal counter.

When flip-flop 64, which was activated by the signal $P_5$, was placed in set position, a negative voltage was imposed upon the gate 93 through line 94. Gate 74 is closed at this time. By opening gate 93, the signals from the log track during the compute cycle will be fed through gate 93, and from there through OR gate 75 to the input line 76 of the binary counter. Also the shift counter will be operated in the same manner as previously explained, so that during the compute cycle a second logarithmic signal will be fed into the binary counter 60 in the same manner as previously explained.

Since the binary counter has been complemented, when the same number of logarithmic pulses have been sent into the binary counter as were stored in it before it was complemented, a maximum count will have been stored in the binary counter. One additional pulse from the log track will return the binary computer to its zero position. The above statement assumes that in counting impulses from the log track during the scan cycle all of the flip-flops of the binary counter were used. The same practical effect occurs when all flip-flops are not used. After counting the second series of log track signals into the binary counter until the first scan and second compute counts become equal, all of the flip-flops beginning at the last point of input and to the left thereof would be in the set position. Then one additional pulse introduced at this point will flip all of the flip-flops to the left thereof to the reset position. Thus in effect, beginning at the point of input and proceeding to the left therefrom, the counter will be first placed in its set or zero position and then one more pulse will flip all of the flip-flops to the reset position. Of course, if at the time of completing the recounting of the original stored logarithmic count in the binary counter, a shift track pulse is received, it may require one or two pulses from the next lower order digit to flip all of the flip-flops to the left thereof from set to reset position.

When the binary counter flip-flop 80j is flipped from set to reset position, a pulse is generated which passes through the differentiation network 95 and OR gate 96 to shift the control flip-flop 89 to reset position. Flipping of this flip-flop 89 to reset position removes the negative voltage from line 97 and closes gate 91 which controls the incoming linear count to the decimal counter. Thus, there has been stored in the decimal counter a count which is equal to the antilog of the count that was stored in the binary counter during the scan cycle.

While one or two additional pulses from a log track are necessary to operate the control flip-flop 89, these additional pulses percentagewise are so small that the two signals from the log tracks; that is, from the scan cycle and the compute cycle which are introduced into the binary counter, may be said for all practical purposes to be equal. At this time the signal $P_1$ is again generated by a pin 40' passing photocell 42 and the counter is reset and ready for another cycle.

The explanation of the computer up to this point has assumed that every scan made by the scanning mechanism was a good scan, that is, two and only two traces were picked up from the chart; however, this condition will not always exist as the two traces may cross or a smudge or speck of dirt, etc. might cause only one or more than two signals to be generated by the photomultiplier.

When a good scan is made, the linear track is permitted to feed through what might be termed good scan gate 91. When a good scan is not made, it is desired to prevent the computations made by the computer from reaching the decimal counter as they would be erroneous, and to substitute therefor as close an approximation as possible to the last good scan. For this purpose, a one scan memory or storage 65 is provided which remembers or stores the antilogarithm of the last good scan logarithm and this last good scan antilogarithm is substituted for the decimal value of the bad scan. If the one scan memory were not used, an approximation could be made by preventing entry of a decimal value for the bad scan into the counter 62 and simultaneously preventing operation of the scan counter during a bad scan and permitting the scan counter to make the desired total number of good scans by repeating a portion of the first scans made when the chart was first placed on the table. For best results with this latter procedure, scanning of the chart should begin at its most average position.

The one scan memory is a binary computer of straight counter form in which flip-flops, such as shown in the binary counter 60, may be used. The gates 79–79j of counter 60 are omitted, and the count is fed directly into the trigger input of the lowest order flip-flop.

To control the one scan memory and substitute its content for a bad scan value, signals are fed through three gates 98, 99, and 100, which are coordinated with the gate 91. The gate 98 is the remembered scan gate which permits introduction of a remembered or stored previous scan antilog into the decimal counter 62 during a bad scan. Gate 99 is the new scan gate which provides for putting a new good scan on the one scan memory. Gate 100 is the bad scan gate which operates the one scan memory when a bad scan occurs. As previously explained, when a signal of the second pressure trace from the chart is received, the ring-switcher flip-flop 63b is flipped to set position. When this is done a negative voltage is supplied through line 101 to the good scan gate 91 and to the new scan gate 99. A negative voltage is also imposed through the line 101 on AND gate 102. If only a single trace is noted or if more than two traces are noted, the flip-flop 63b of the ring-switcher will stay or be returned to reset position. Under these conditions, the negative voltage will not be imposed on line 101 during the compute cycle but will instead be on line 85, which may be termed the bad scan input line, as it supplies a negative voltage to the remembered scan gate 98 and to the bad scan gate 100. A negative voltage is also applied through line 85 to gate 103 which controls the one scan memory.

Assuming that two and only two signals are received from the photomultiplier, the line 101 will impose a negative voltage on gate 102 during the latter portion of the scan cycle. Then at the end of the scan cycle the complementing pulse is fed from line 88 to the gate 102, as well as to the several flip-flops of the binary counter. This complementing pulse passes through gate 102 to line 104 and resets the one scan memory unit to zero. The complementing pulse also resets flip-flop 105. Flip-flop 105 is the complement switch for the one scan memory.

When a good scan has thus been completed, the compute cycle, with the one scan memory unit reading zero, is begun. As the linear track pulses are fed into the decimal counter 62 through the good scan gate 91, pulses will also be fed from the linear track through the new scan gate 99 to the one scan memory unit 65. When the control flip-flop 89 which receives the impulse from the binary computer flips to reset position, it removes the negative voltage from one of the inputs to the good scan gate 91 and also to the new scan gate 99, thus storing in both the decimal counter and one scan memory the linear number which is the antilog of the original value stored in the binary counter.

If continued good scans are received, the one-scan memory will be reset each time and a new number stored therein. In the event a bad scan is encountered and the ring-switcher flip-flop **63*b* remains or is returned to its reset position, the bad scan circuit 85 will have a negative voltage thereon and this voltage will be applied to the complement gate 103. Then at the end of the bad scan cycle, the binary counter will be complemented and this complement pulse will pass through gate 103. As the good scan circuit is not energized, the gate 102 will block the complementing pulse from resetting the one-scan memory. The signal passing through gate 103 sets the complement flip-flop 105 which imposes a complement pulse on the one-scan memory through line 106 to complement the one-scan memory. This signal from line 88 also places a flip-flop 107 in set position, which in turn generates a signal which opens gate 98. During the compute cycle following a bad scan, the gates 98 and 100** being opened, the linear signal is fed through these gates to the one-scan memory and to the decimal counter.

When the one-scan memory has been driven to its maximum capacity plus one additional pulse, it will impress a signal on line 108 which flips the flip-flop 107 to its reset position. This will remove the negative voltage from line 109 which was generated by the flip-flop 107, and, as this removes one of the voltage inputs to the remembered scan AND gate 98, this gate is now closed. Therefore, the number of which the complement was stored in the one-scan memory has been introduced into the decimal counter as a substitute for the bad scan value.

At this time, a portion of the linear track has been used which is equal to the number of which the complement was previously stored in the one-scan memory, and the one-scan memory has been returned to zero. By making the capacity of the one-scan memory equal to the total number of linear pulses which can be generated by the linear track, the one-scan memory can be made to store therein the complement of the number computed by the binary computer at the end of the compute cycle. This can be done by continuing to count into the memory the full number of pulses of the linear track, even though count to the accumulator was stopped when the memory passed through its full or zero state. This should be done in order to prepare the memory for a possible reuse in case of another bad scan. With this arrangement, after the last pulse from the linear track has been counted into the memory, the memory will be in the same condition as it was after having been complemented and will contain a number equal to the capacity of the memory, and, therefore, of the linear track, less the linear number representative of the last good scan. This is the complement of the value of the last good scan.

If more than one bad scan be successively made, it is necessary again to introduce into the decimal counter the last remembered or stored good scan value, and since the one-scan memory contains the complement of this number, it is in condition for a repetition of the count of the stored value into the linear counter and the accumulator.

The complement flip-flop 105 is in the set position and does not return to the reset position until a good scan is received and a signal transmitted through the gate 102. Therefore, retention of the complement of the remembered number in the one-scan memory through the scan cycle makes it available for operation in the manner previously explained. For this purpose, the bad-scan gate 100 is provided with a negative voltage input through line 110. The line 110 is fed from the set side of flip-flop 64, which is in the reset position during the scan cycle, so that the gate 100 is closed during each scan cycle.

At the end of a scan cycle, the flip-flop 64 is in its set position, line 110 carries a negative voltage, and the gate 100 is open. As a result, the complement of the remembered number remains on the one-scan memory, and after a bad scan, the linear track will feed through gate 100 during the next compute cycle. If the next scan cycle is bad, flip-flop **63*b* is not in set position when the complementing pulse is generated, and, therefore, gate 102 remains closed and the memory is not returned to zero. The complementing pulse will, however, flip flip-flop 107 to set position and again open gate 98. Then during the compute cycle, the linear track will again feed into the one-scan memory, and, when the memory unit returns to zero, flip-flop 107** will be flipped to reset position. As the linear track has meanwhile been feeding into the decimal counter, the last remembered good scan is again placed in the decimal counter. At the end of the compute cycle, the one scan memory will again have stored therein the complement of the last good scan and the cycle explained above will be continued until a good scan is received.

The mensuration of decimal values during the compute cycle of the values scanned, as determined by the pulses generated by the linear track 15 and its associated electromagnetic radiation sensing apparatus, provides a simple clock pulse generator measurement of the functions of the traces on the chart. Any other suitable clock pulse generator, similarly controlled by noting the start of a scan and the sensing of a trace or by other limits determinative of the measurement, as represented by the logarithmic count in the log counter for a good scan or by the remembered number in the memory for substitution for a bad scan, could be used for determining the value of the trace function measured by the scanner and for generating and entering a decimal count into the accumulator corresponding to such value.

The output from the scan counter 66 supplies a negative voltage to good scan gate 91 and remembered scan gate 68 through line 111. As soon as the scan counter has counted a predetermined number of scans, this voltage is removed from line 111, which closes both the good scan gate 91 and the remembered scan gate 98, and the count standing in the decimal counter will represent the total flow through the line during the period represented on the chart.

In operating the computer, the scan counter should be pre-set to provide a number of revolutions equal in value to the hours on the chart and, therefore, a chart which is not completely used may be read by this device by relating the number of counts permitted by the scan counter to the hours during which the chart was used. Also, the count in the decimal counter may be read directly or it may be automatically printed on printer 112 by a signal from the scan counter, if desired.

While the scanners have been illustrated as utilizing electromagnetic radiation sensing units, and more specifically light sources and photosensitive members, these can comprise other suitable electromagnetic scanning devices, such as well known types of electromagnetic scanners as that disclosed in Patent 1,555,281—Engl et al., Patent 2,882,475—De Neergaard, or Patent 3,025,444—Myska, wherein the records may be on magnetizable media, as well as on light sensible media, or of the type disclosed in Patent 2,628,572—LeGoff, wherein the code is formed in a rotatable wheel or disk and comprises magnetic members arranged in a predetermined order which is sensed by the sensing member similar to the optical sensing of a coded disk in the Myska Patent 3,025,444. These variations are not illustrated in detail in the apparatus shown in the drawings, as specific details thereof are not part of this invention and the illustrated embodiment serves to disclose the novel and useful aspects of the features involved and the inventive details thereof.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A chart scanner comprising, a chart table for supporting a circular chart having coordinates for traces representing relations of a variable to time, means for rotating the chart table, a scanning disc overlying said chart table, means for rotating said scanning disc, a plurality of lenses mounted on the disc and arranged to travel successively over coordinates of the chart variable during rotation of said scanning disc, a mirror associated with each lens for reflecting light from its associated lens toward the axis of rotation of said scanning disc, a photoelectric cell mounted over the center of rotation of said scanning disc for receiving light from said mirrors as each lens travels along a coordinate of the chart variable, and means including a coded disc rotatable at a speed related to the scanning movement of the lenses and responsive to the sensing of the traces by said photoelectric cell for providing a measurement related to the sensed traces.

2. Apparatus for reading a two coordinate chart comprising means for moving the chart along one of its coordinates, means rendering a trace on the chart electromagnetic radiation sensible, electromagnetic radiation sensitive means for scanning substantially succeeding increments of the coordinate along which the chart is moved and measuring the value of a chart trace from a reference point, said scanning means including a plurality of angularly spaced revolvable electromagnetic radiation pickups movable over the chart substantially along the other of the chart coordinates, an electromagnetic radiation sensing means, means for directing electromagnetic radiations picked up to said sensing means, a clock pulse generator, means for counting clock pulses from said generator, means for initiating such clock pulse counting corresponding to movement of a pickup over a given reference on a chart, and means for stopping such clock pulse counting corresponding to sensing of a trace on the chart by said sensing means whereby the clock pulses so counted represent a value which is a function of the trace thus sensed.

3. Apparatus for reading a two coordinate chart comprising means for moving the chart along one of its coordinates, means rendering a trace on the chart electromagnetic radiation sensible, electromagnetic radiation sensitive means for scanning substantially succeeding increments of the coordinate along which the chart is moved and measuring the value of a chart trace from a reference point, said scanning means including a plurality of angularly spaced revolvable optical pickup lenses movable over the chart substantially along the other of the chart coordinates, an electromagnetic radiation sensing means, means for directing electromagnetic radiations picked up by said lenses to said sensing means, a clock pulse generator, and means for counting clock pulses from said generator during movement of a lens corresponding to a given reference on a chart to a trace thereon as sensed by said sensing means whereby the clock pulses so counted represent a value which is a function of the trace thus sensed.

4. Apparatus for reading a two coordinate chart comprising means for moving the chart along one of its coordinates, means for illuminating at least a portion of a chart to be scanned, means for scanning substantially succeeding increments of the coordinate along which the chart is moved and measuring the value of a chart trace from a reference point, said scanning means including a plurality of angularly spaced revolvable optical pickup lenses movable over the chart along the other of the chart coordinates, a photoelectric cell sensing means, means for directing light picked up by said lenses to said photoelectric cell sensing means, a clock pulse generator, means for counting clock pulses from said generator, means for initiating such clock pulse counting corresponding to movement of a lens over a given reference on a chart, and means for stopping such clock pulse counting corresponding to sensing of a trace on the chart by said sensing means whereby the clock pulses so counted represent a value which is a function of the trace thus sensed.

5. Apparatus for reading a two coordinate chart comprising means for moving the chart along one of its coordinates, means rendering a trace on the chart electromagnetic radiation sensible, electromagnetic radiation sensitive means for scanning substantially succeeding increments of the coordinate along which the chart is moved and measuring the value of a chart trace from a reference point, said scanning means including a plurality of angularly spaced revolvable optical pickup lenses movable over the chart substantially along the other of the chart coordinates, an electromagnetic radiation sensing means, means for directing electromagnetic radiations picked up by said lenses to said sensing means, a clock pulse generator, means for counting clock pulses from said generator, means for initiating such clock pulse counting during movement of a lens corresponding to a given reference on a chart, and means for stopping such clock pulse counting corresponding to sensing of a trace on the chart by said sensing means whereby the clock pulses so counted represent a value which is a function of the trace thus sensed.

6. Apparatus comprising electromagnetic radiation sensitive means for scanning substantially successive abscissa increments of a chart and providing a trace signal for each trace sensed, and means for providing a measurement from a reference to the ordinate value of a sensed trace and connected to receive said trace signal in determining the value of said ordinate measurement, said measurement means providing a linear measurement of the ordinate scanned and comprising an analog integrator providing a voltage output directly proportional to the linear ordinate values measured.

7. Apparatus as defined in claim 6 wherein said analog integrator has a variable input resistance adapted to be varied according to the rate at which it is desired to have the integration by the integrator proceed.

References Cited

UNITED STATES PATENTS

| | | | |
|---|---|---|---|
| 2,765,211 | 10/1956 | Brinster et al. | 235—61 X |
| 2,792,173 | 5/1957 | Schuster | 235—61.6 |
| 2,829,825 | 4/1958 | Henri-Georges Doll | 235—61.6 |
| 2,868,449 | 1/1959 | Brinster et al. | 235—61.6 |
| 2,964,240 | 12/1960 | Brinster et al. | 235—61.6 |

MAYNARD R. WILBUR, *Primary Examiner.*

DARYL W. COOK, *Examiner.*